(12) United States Patent
Takahashi

(10) Patent No.: US 7,628,970 B2
(45) Date of Patent: Dec. 8, 2009

(54) METHOD OF PREPARING FEEDSTOCK LIQUID, METHOD OF PREPARING URANYL NITRATE SOLUTION, AND METHOD OF PREPARING POLYVINYL ALCOHOL SOLUTION

(75) Inventor: Masashi Takahashi, Ibaraki (JP)

(73) Assignee: Nuclear Fuel Industries, Ltd., Tokyo (JP)

( * ) Notice: Subject to any disclaimer, the term of this patent is extended or adjusted under 35 U.S.C. 154(b) by 320 days.

(21) Appl. No.: 10/583,906

(22) PCT Filed: Dec. 22, 2004

(86) PCT No.: PCT/JP2004/019171

§ 371 (c)(1),
(2), (4) Date: Jun. 22, 2006

(87) PCT Pub. No.: WO2005/061387

PCT Pub. Date: Jul. 7, 2005

(65) Prior Publication Data

US 2007/0178036 A1   Aug. 2, 2007

(30) Foreign Application Priority Data

Dec. 24, 2003  (JP) ............................. 2003-427059
Aug. 6, 2004   (JP) ............................. 2004-230327
Aug. 6, 2004   (JP) ............................. 2004-230385
Aug. 6, 2004   (JP) ............................. 2004-230481
Oct. 12, 2004  (JP) ............................. 2004-298114

(51) Int. Cl.
*C01G 43/01* (2006.01)

(52) U.S. Cl. ..................................................... 423/253

(58) Field of Classification Search .................. 423/253
See application file for complete search history.

(56) References Cited

U.S. PATENT DOCUMENTS 4,202,793 A * 5/1980 Bezzi et al. .................. 252/635

(Continued)

FOREIGN PATENT DOCUMENTS

EP       1 081 716 A1       3/2001

(Continued)

OTHER PUBLICATIONS

"Genshiro Zairyo Handbook" or "A Handbook about Nuclear Reactor Materials", published by Nikkan Kogyo Shimbun, Ltd., title pages and pp. 227-239, Oct. 31, 2977.

(Continued)

*Primary Examiner*—Jerry Lorengo
*Assistant Examiner*—Yun Qian
(74) *Attorney, Agent, or Firm*—Frishauf, Holtz, Goodman & Chick, P.C.

(57) ABSTRACT

The object of the present invention is to provide a feedstock liquid, from which fuel kernels with good quality can be produced, and a method of preparing the feedstock liquid. The present invention provides a feedstock liquid with a viscosity from $4.0 \times 10^{-2}$ to $6.5 \times 10^{-2}$ Pa·s at 15° C., for the production of ammonium diuranate particles. The present invention also provides a method of preparing a feedstock liquid used for the production of ammonium diuranate particles, which includes mixing a uranyl nitrate solution and tetrahydrofurfuryl alcohol to produce a uranyl nitrate mixture, dissolving polyvinyl alcohol in water to produce an aqueous polyvinyl alcohol solution, mixing the aqueous polyvinyl alcohol solution with tetrahydrofurfuryl alcohol to produce a polyvinyl alcohol solution, and mixing the uranyl nitrate mixture with the polyvinyl alcohol solution.

19 Claims, 3 Drawing Sheets

U.S. PATENT DOCUMENTS 4,778,665 A * 10/1988 Krishnamurthy et al. . 423/239.2
5,514,306 A *  5/1996 Larson et al. ................. 264/0.5
5,698,173 A * 12/1997 McLean et al. ............. 423/253

FOREIGN PATENT DOCUMENTS

| ES | 2 102 933 A1 |   | 8/1997  |
|----|--------------|---|---------|
| JP | 05-279043 A  |   | 10/1993 |
| JP | 06-191851 A  |   | 7/1994  |
| JP | 06066756     | * | 11/1994 |
| JP | 08-151204 A  |   | 6/1996  |
| JP | 8-151204 A   |   | 6/1996  |
| JP | 09-054187 A  |   | 2/1997  |

OTHER PUBLICATIONS

"Genshiryoku Handbook" or "Nuclear Energy Handbook", published by Ohmsha, Ltd., title pages and pp. 528-529, Dec. 20, 1995.
Notification of Reasons for Rejection issued by the JPO mailed on Feb. 27, 2009 regarding Japanese Patent Application No. 2003-427059 (with English translation of said Notification).

* cited by examiner

[Fig. 1]
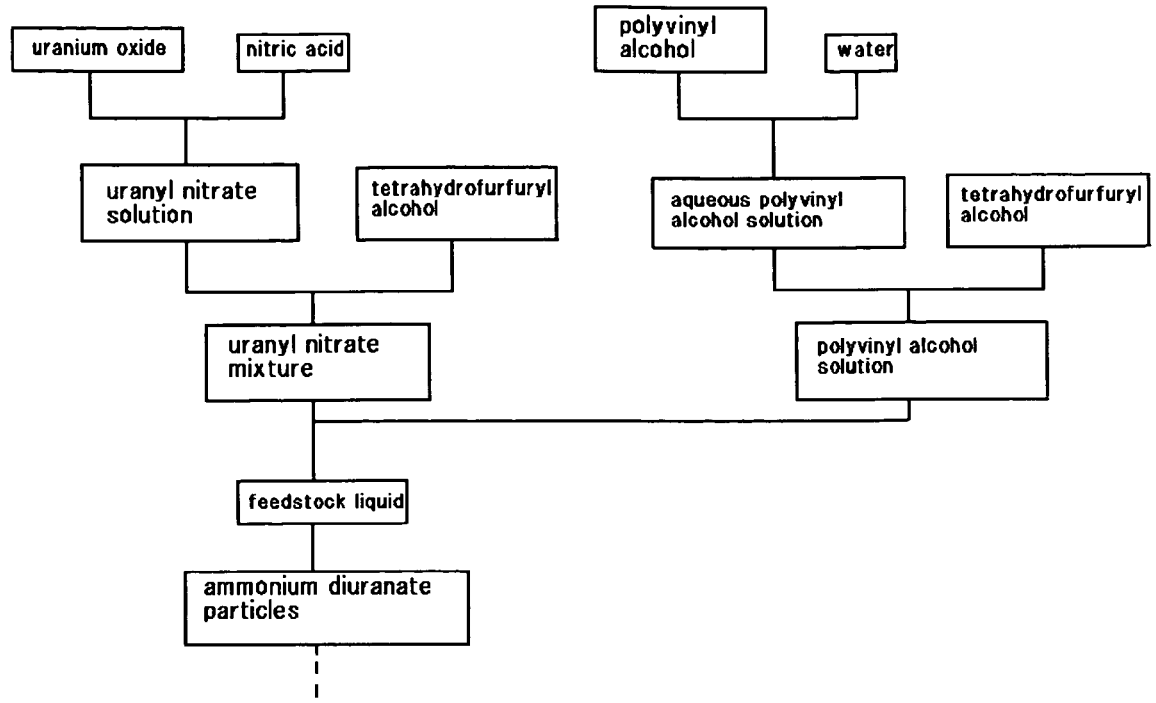
[Fig. 2]
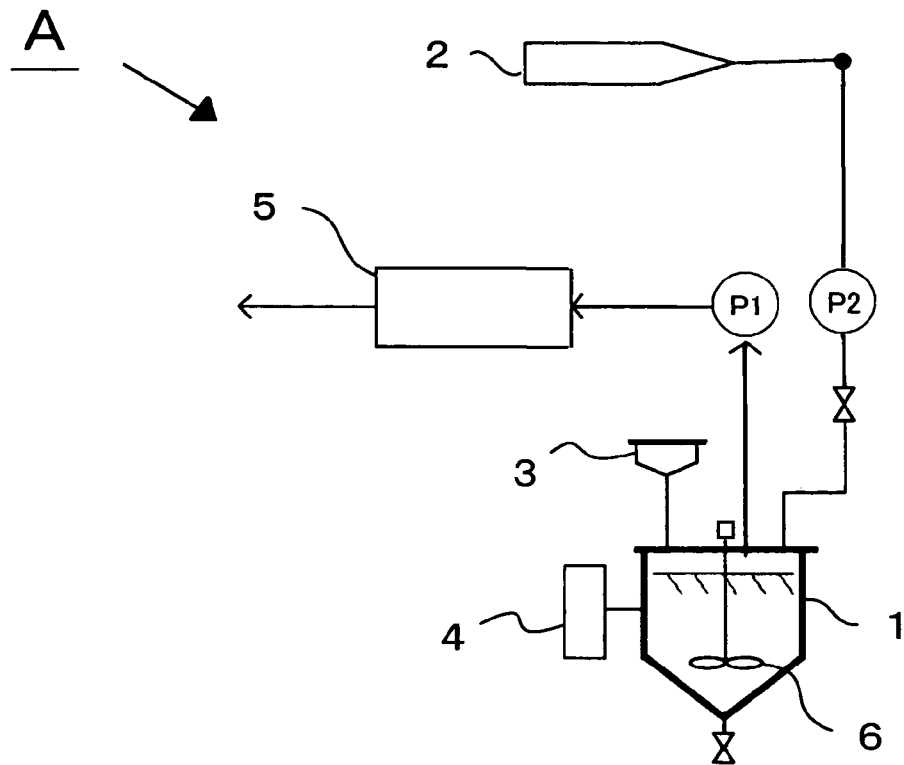

[Fig. 3]
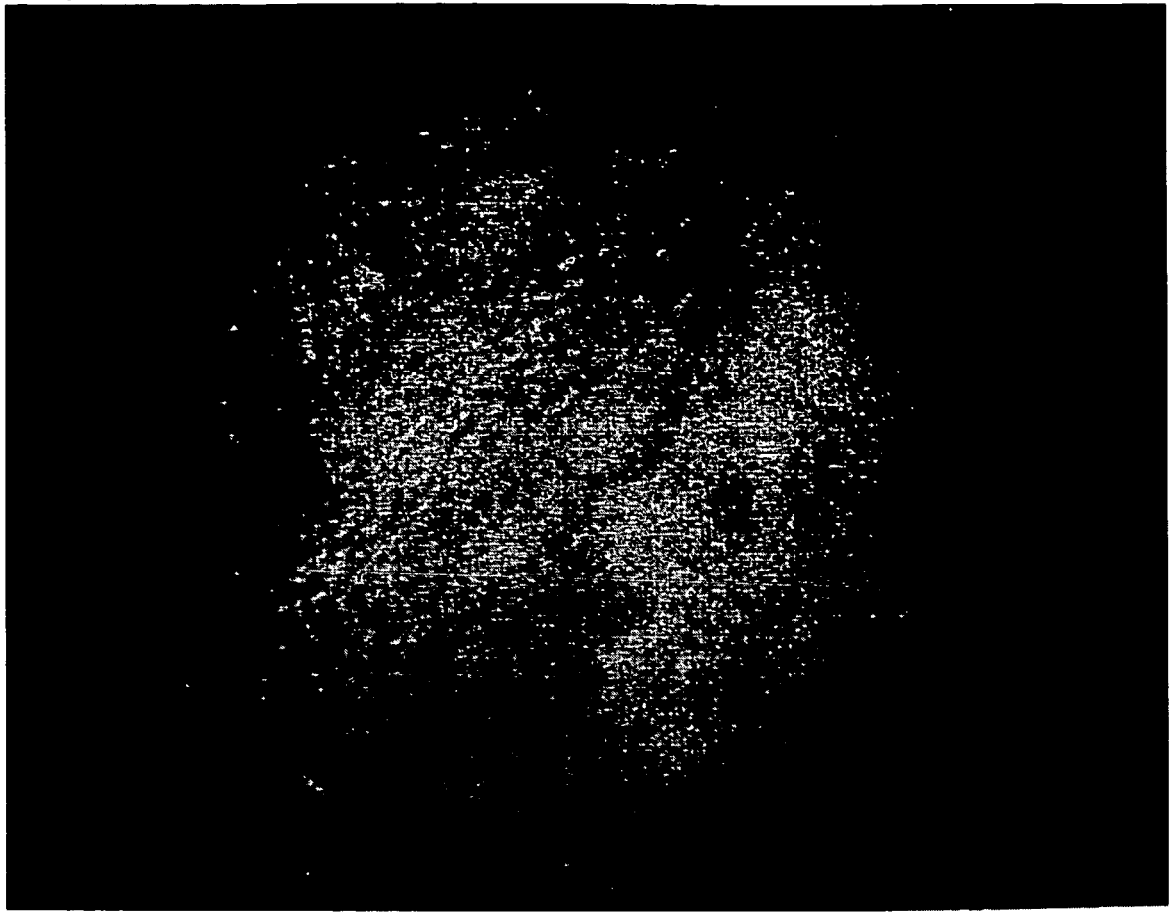
[Fig. 4]
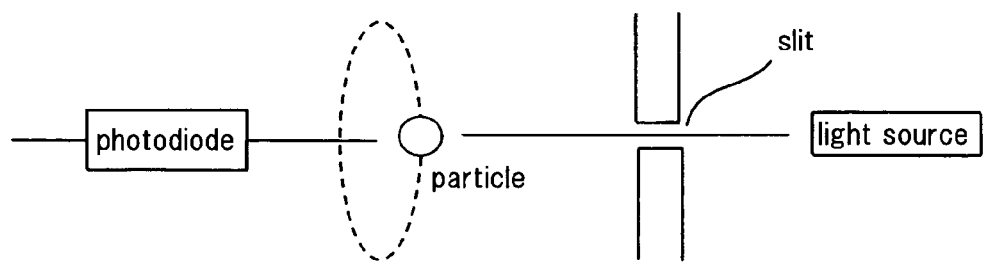

[Fig. 5]
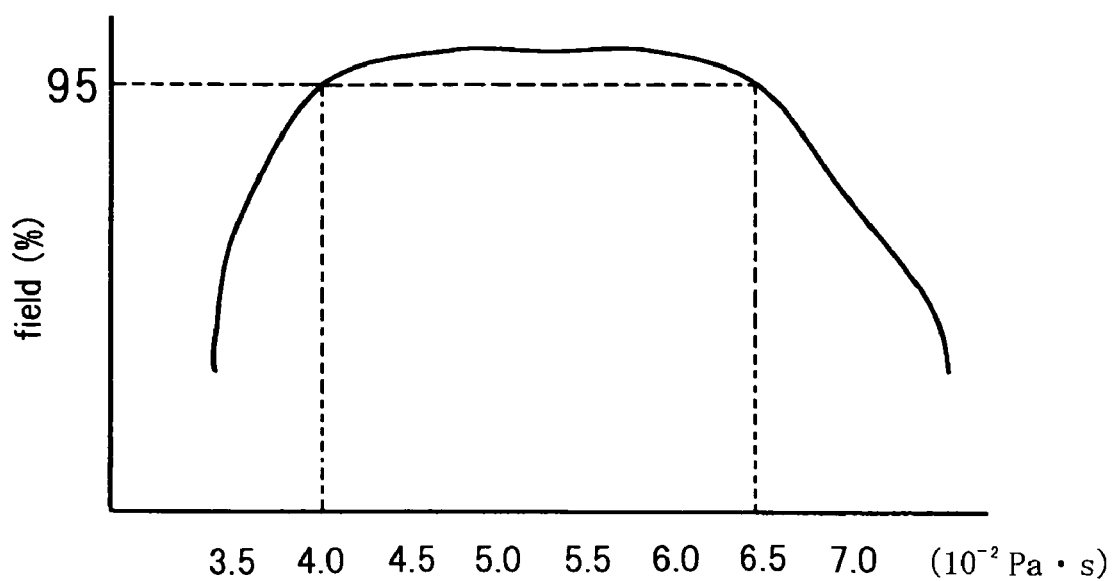
Viscosity of Feedstock Liquid at 15 °C
[Fig. 6]
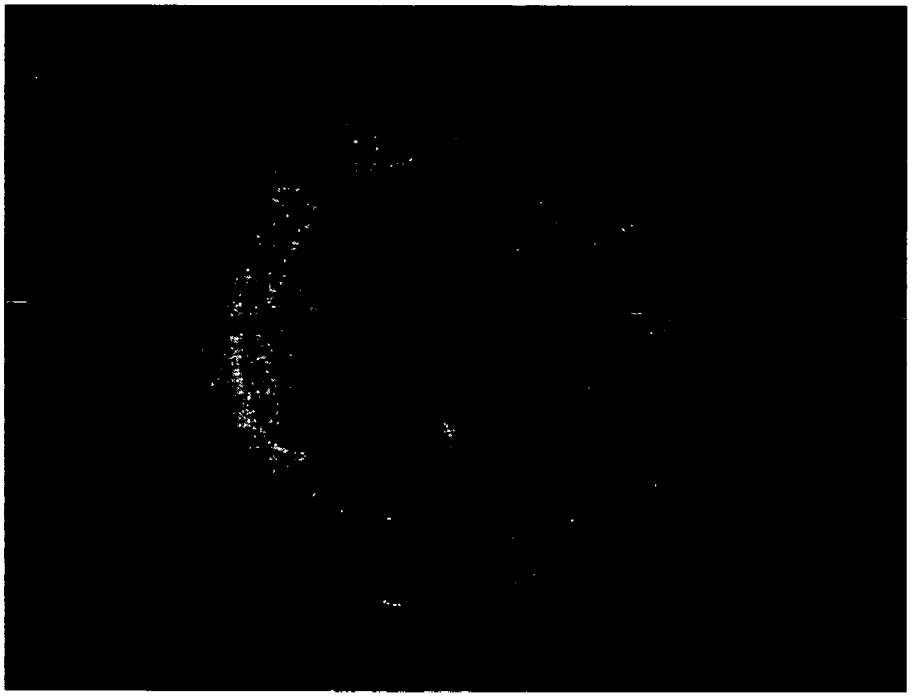

METHOD OF PREPARING FEEDSTOCK LIQUID, METHOD OF PREPARING URANYL NITRATE SOLUTION, AND METHOD OF PREPARING POLYVINYL ALCOHOL SOLUTION

This application is the United States national phase application of International Application PCT/JP2004/019171 filed Dec. 22, 2004.

TECHNICAL FIELD

The present invention relates to a feedstock liquid, a method of preparing the feedstock liquid, a method of preparing a uranyl nitrate solution, and a method of preparing a polyvinyl alcohol solution. More particularly, the present invention relates to a feedstock liquid including uranyl nitrate, appropriate for the production of ammonium diuranate particles with good sphericity that are used for the production of fuels for high-temperature gas reactors, a method of producing the feedstock liquid, and a method of preparing a uranyl nitrate solution and a polyvinyl alcohol solution, both being used for preparation of the feedstock liquid.

BACKGROUND ART

A high-temperature gas reactor has a reactor core, into which fuels for the high-temperature gas reactor are introduced, which reactor core is made of graphite that has a large thermal capacity and keeps its crystalline structure in good condition at high temperatures. The high temperature gas reactor employs, as coolant gas, a gas such as helium gas, which is assessed as being safe because helium gas does not react even at high temperatures. The employment of helium gas makes it possible to take the coolant gas away safely even when the temperature around the outlet of the coolant gas is high. Therefore, the coolant gas, which has been heated up to a high temperature of about 1000° C., is used as a heat source in a wide variety of fields such as hydrogen production and chemical plants, as well as power plants.

Fuels for the high-temperature gas reactor typically comprises a fuel kernel and a coating layer with which the fuel kernel is covered. The fuel kernel is a small particle with a diameter of about 350 to 650 µm, made by sintering uranium dioxide into a physical state like ceramics.

The coating layer generally comprises concentrically laminated sub-coating layers. When the coating layer has four sub-coating layers, they are called "the first sub-coating layer", "the second sub-coating layer", "the third sub-coating layer", and "the fourth sub-coating layer" from the sub-coating layer adjacent to the fuel kernel. The diameter of the particle comprising the fuel kernel and four sub-coating layers is typically about 500 to 1000 µm.

The fuel kernels may be produced in the following way with an apparatus for producing ammonium diuranate particles. Firstly, a uranium oxide in the form of powder is dissolved in nitric acid, which produces a uranyl nitrate solution. Then, the uranyl nitrate solution is mixed with pure water, a thickening agent, and other chemicals, if necessary, and the mixture is stirred. A feedstock liquid to be dripped is obtained by this process. The feedstock liquid is stored in a feedstock liquid reservoir. The feedstock liquid thus prepared is cooled to a predetermined temperature, the viscosity thereof is adjusted, and then it is transferred to a dripping nozzle device. The dripping nozzle device has one nozzle with a small diameter. The transferred feedstock liquid falls in drops from the end of the nozzle into an aqueous solution of ammonia. The uranyl nitrate included in the drops, which have fallen into the aqueous solution of ammonia, changes into ammonium diuranate from the surfaces of the drops through the reaction. If the drops including uranyl nitrate reside in the solution for a time period enough to complete the reaction, uranyl nitrate in the central part of each drop is changed to ammonium diuranate.

The drops dripped from the nozzle pass through an atmosphere of ammonia gas in the process of falling toward the surface of the aqueous ammonia solution. This ammonia gas brings about gelation on the surface of each drop, which forms a film there. The drops with the film are protected from deformation to some extent, caused by the impact that occurs when the drops fall to and hit the surface of the aqueous ammonia solution. If uranyl nitrate included in the drops that have fallen into the solution reacts with ammonia sufficiently, ammonium diuranate particles, which may sometimes be abbreviated to "ADU particles", are formed.

The ADU particles thus formed are washed, dried, and then calcined in the atmosphere, which changes the ADU particles in to uranium trioxide particles. The obtained uranium trioxide particles are reduced and sintered, through which steps the uranium trioxide particles are changed into uranium dioxide particles with high density, in a condition like ceramics. The uranium dioxide particles are sieved, or classified, and fuel kernel particles with a diameter within a predetermined range are obtained.

After the coating layer is formed on the kernel particles, the fuels for the high-temperature gas reactor are fabricated into fuel compacts or fuel pebbles. The fuel compacts or pebbles are obtained by pressing or molding the fuels with a graphite matrix material made of graphite powder, a binder and other components into cylinders with contents, hollow cylinders, or spheres, and calcining the pressed or molded. See "Genshiro Zairyo Handbook", or "A Handbook about Nuclear Reactor Materials", published by The Nikkan Kogyo Shimbun, Ltd. on Oct. 31, 1977, and "Genshiryoku Handbook", or "Nuclear Energy Handbook", published by Ohmsha, Ltd. on Dec. 20, 1995.

In a process of producing fuels for the high-temperature gas reactor described in "Genshiro Zairyo Handbook", a feedstock liquid, from which ammonium diuranate particles are prepared, is obtained by adding pure water and a thickening agent to a uranyl nitrate stock solution and stirring the obtained mixture. However, the handbook lacks an explanation of detailed conditions necessary for the preparation. A person skilled in the art of the field of nuclear energy, reading only this book, is unable to produce ammonium diuranate particles with good sphericity and a flawless inside structure.

Uranyl nitrate was prepared by reacting nitric acid with a uranium oxide, for example, triuranium octaoxide, in accordance with the following reaction formula:

$$U_3O_8 + 8HNO_3 \rightarrow 3UO_2(NO_3)_2 + 2NO_2\uparrow + 4H_2O \qquad (1)$$

Based on formula (1), the skilled artisan thought that when 2.66 moles or more of nitric acid was used for 1 mole of uranium, uranyl nitrate could stoichiometrically be prepared without leaving unreacted uranium oxide, for example, triuranium octaoxide. However, the conventional method that used an excess amount of nitric acid cost much and the nitrogen content in the waste fluid was inevitably raised, which resulted in an increased burden on the environment. On the other hand, when less than 2.66 moles of nitric acid was used for 1 mole of uranium, stoichiometrically, unreacted uranium oxide, for example, unreacted triuranium octaoxide was left after the reaction. The unreacted uranium oxide was sometimes included in a uranyl nitrate stock solution, which led to a failure in producing ammonium diuranate particles as previously planned. Besides, the skilled artisan could not expect that ammonium diuranate particles with good sphericity would be produced.

DISCLOSURE OF THE INVENTION

[Problems to be Solved by the Invention]

The object of the present invention is to overcome the problems associated with the conventional technology.

An objective of the present invention is to provide a method of preparing a feedstock liquid for the production of ammonium diuranate particles with good sphericity and a flawless inside structure, from which fuel kernels with good sphericity are produced at high yield.

Another objective of the present invention is to provide a method of preparing a uranyl nitrate solution at a low cost, the method capable of producing ammonium diuranate particles with good quality and reducing the burden on the environment while a uranium oxide and nitric acid, the amount of which is decreased for the amount of uranium, are reacted.

[Means for Solving the Problems]

The first means for solving the problems is a feedstock liquid with a viscosity from $4.0 \times 10^{-2}$ to $6.5 \times 10^{-2}$ Pa·s at 15° C., for the production of ammonium diuranate particles.

The second means is the feedstock liquid according to the first means, wherein the feedstock liquid comprises uranyl nitrate, tetrahydrofurfuryl alcohol, and polyvinyl alcohol.

The third means is a method of preparing a feedstock liquid used for the production of ammonium diuranate particles, which comprises mixing a uranyl nitrate solution and tetrahydrofurfuryl alcohol to produce a uranyl nitrate mixture, dissolving polyvinyl alcohol in water to produce an aqueous polyvinyl alcohol solution, mixing the aqueous polyvinyl alcohol solution with tetrahydrofurfuryl alcohol to produce a polyvinyl alcohol solution, and mixing the uranyl nitrate mixture with the polyvinyl alcohol solution.

The fourth means is the method according to the third means, wherein the total amount of the aqueous polyvinyl alcohol solution in the feedstock liquid is 15 to 20% by volume based on the entire volume of the feedstock liquid.

The fifth means is the method according to the third means or the fourth means, wherein the total amount of tetrahydrofurfuryl alcohol in the feedstock liquid is 40 to 50% by volume based on the entire volume of the feedstock liquid.

The sixth means is the method according to any one of the first to fifth means, wherein the mixing of the uranyl nitrate mixture with the polyvinyl alcohol solution is carried out under stirring, which is followed by degassing and adjusting the volume by adding pure water.

The seventh means is the method according to any one of the third to sixth means wherein the uranium content in the feedstock liquid is from 0.6 to 0.9 mol-U/L.

The eighth means is the method according to any one of the third to seventh means wherein when the polyvinyl alcohol solution is prepared by mixing the aqueous polyvinyl alcohol solution with tetrahydrofurfuryl alcohol, the tetrahydrofurfuryl alcohol is added before a temperature of the aqueous polyvinyl alcohol solution decreases to 50° C. at the lowest.

The ninth means is a method of preparing a feedstock liquid for the production of ammonium diuranate particles, the feedstock liquid including uranyl nitrate, an aqueous polyvinyl alcohol solution, and tetrahydrofurfuryl alcohol, wherein the polyvinyl alcohol is weighed when it is dry.

The tenth means is the method according to the ninth means wherein the dry polyvinyl alcohol is made by heating a polyvinyl alcohol that has absorbed moisture.

The eleventh means is the method according to the ninth means wherein the dry polyvinyl alcohol is a polyvinyl alcohol that has been stored with a desiccant.

The twelfth means is a method of preparing a uranyl nitrate solution used in preparing a feedstock liquid for the production of ammonium diuranate particles, which comprises reacting nitric acid with a uranium oxide so that the molar ratio (A/B) of nitric acid (A) to uranium (B) is from 2.1 to 2.6.

The thirteenth means is the method according to the twelfth means, wherein the reaction between nitric acid and the uranium oxide is carried out at a temperature from 70 to 110° C.

The fourteenth means is a method according to the twelfth or thirteenth method, further comprising a step in which NOx gas produced in the reaction is treated chemically.

The fifteenth means is a method of preparing a polyvinyl alcohol solution used in preparing a feedstock liquid for the production of ammonium diuranate particles, which comprises mixing polyvinyl alcohol and water to prepare from 6 to 9 mass % of an aqueous polyvinyl alcohol solution, and mixing the aqueous polyvinyl alcohol solution with tetrahydrofurfuryl alcohol.

The sixteenth means is the method according to the fifteenth method, wherein the polyvinyl alcohol is dissolved in water while the polyvinyl alcohol and water are being heated to a temperature of at least 75° C.

The seventeenth means is the method according to the fifteenth or sixteenth method, wherein from 1 to 50% by volume of tetrahydrofurfuryl alcohol based on the entire volume of tetrahydrofurfuryl alcohol included in the feedstock liquid is mixed with the aqueous polyvinyl alcohol solution at a temperature of at least 50° C.

The present invention employs a feedstock liquid, the viscosity of which is adjusted to $4.0 \times 10^{-2}$ to $6.5 \times 10^{-2}$ Pa·s, which enables drops falling from a dripping nozzle toward an aqueous ammonia solution to keep their shapes spherical by surface tension, which prevents the drops from being easily broken or deformed by the impact that occurs when the drops fall to and hit the surface of the aqueous ammonia solution. Also, the viscosity in the range prevents the feedstock liquid from stopping up the nozzle through which the feedstock liquid is dripped. Therefore to drip the feedstock liquid including uranyl nitrate with the specified viscosity makes it possible to produce ammonium diuranate particles with good sphericity, which leads to the production of fuel kernels with good quality.

The present invention provides a feedstock liquid with such a viscosity that when the feedstock is dripped from a dripping nozzle toward an aqueous ammonia solution, the dripped drops keep their shapes spherical by surface tension, which prevents the drops from being easily broken or deformed by the impact that occurs when the drops fall to and hit the surface of the aqueous ammonia solution, by producing the feedstock liquid through mixing a uranyl nitrate solution with tetrahydrofurfuryl alcohol, which may sometimes be called "THFA" hereinafter, to prepare a uranyl nitrate mixture; mixing an aqueous polyvinyl alcohol solution, which may sometimes be called "aqueous PVA solution" hereinafter, obtained by dissolving polyvinyl alcohol, which may sometimes be called "PVA" hereinafter, in water, with THFA to prepare a polyvinyl alcohol solution, which may sometimes be called "PVA solution"; and mixing the uranyl nitrate mixture with the PVA solution. Ammonium diuranate particles produced from the feedstock liquid prepared in the method according to the present invention have good sphericity, and fuel kernels with good sphericity are produced from the ammonium diuranate particles with such good sphericity.

In the method of preparing a feedstock liquid according to the present invention, PVA in the PVA solution to be mixed with the uranyl nitrate mixture is weighed when it is dried, which means that a predetermined weight of PVA is taken accurately. As a result, this drying-weighing method prevents the preparation of a feedstock liquid with a viscosity lower than a predetermined viscosity, caused by weighing and adding a wet thickening agent. Drops falling from the dripping nozzle, made from the feedstock liquid of the present method, are able to keep the shape of a sphere. Even after receiving an impact given to the drops when they hit the aqueous ammonia solution, the drops can keep their shape and the resultant ammonium diuranate particles formed in the aqueous ammonia solution are hard to deform. Therefore ammonium diuranate particles with good sphericity can be prepared, which leads to the production of fuel kernels with good sphericity at a high yield.

The method of preparing a uranyl nitrate solution according to the present invention employs the molar ratio of nitric acid to uranium (nitric acid/uranium) of 2.1 to 2.6, which prevents occurrence of undissolved residue when the uranium oxide, for example, triuranium octaoxide, is dissolved in nitric acid. This special range of the molar ratio also increases the solubility of triuranium octaoxide in nitric acid and decreases the amount of nitric acid used for this reaction. Therefore the total amount of the waste liquid can be reduced, which, in turn, reduces the preparation cost of the uranyl nitrate solution, compared with the conventional method. Furthermore, because the prepared uranyl nitrate does not include undissolved residues, a feedstock liquid with a predetermined uranium content can be dripped in an aqueous ammonia solution in each batch, which results in the formation of ammonia diuranate particles with good sphericity and the flawless inside structure. Also, when uranium powders with two or more enrichments are dry-blended, ammonium diuranate particles with a predetermined enrichment can be produced since the prepared uranyl nitrate solution does not include undissolved residues. From ammonium diuranate particles with good sphericity and the flawless inside structure can be produced fuel kernels with good sphericity and a flawless inside structure.

In addition, the decrease in the amount of nitric acid used is accompanied by a decrease in the amount of nitrogen in the waste liquid. Moreover, the amount of ammonium nitrate formed in the reaction between the aqueous ammonia solution and nitric acid can be reduced, which, in turn, reduces the amount of ammonium nitrate adhering to the surfaces of the ammonium diuranate particles. Then, the amount of warm water used for washing off the ammonium nitrate adhering to the surfaces of the ammonium diuranate particles can be reduced. Therefore the burden to the environment by nitrogen in the waste fluid and the waste warm water can be decreased.

The method of preparing a PVA solution according to the present invention can provide an aqueous PVA solution appropriate for the preparation of a feedstock liquid that includes uranyl nitrate and does not include undissolved residues of PVA, and has a predetermined viscosity.

Because PVA is dissolved in water at a temperature of at least 75° C., the dissolution of PVA in water is done quickly and undissolved solid PVA residues do not remain.

In the present invention, a predetermined portion of THFA, of the total amount of THFA included the feedstock liquid, and the aqueous PVA solution are mixed at a predetermined temperature, which results in the preparation of a feedstock liquid with a predetermined viscosity, from which ammonium diuranate particles with good sphericity and the flawless inside structure and without deterioration by gelation can be produced.

BRIEF DESCRIPTION OF THE DRAWINGS

FIG. 1 is a diagram that shows a process of preparing a feedstock liquid according to the present invention.

FIG. 2 is an illustration that shows an example of the apparatus of preparing a uranyl nitrate solution.

FIG. 3 is a photograph by light microscope that shows a section of an ammonium diuranate particle obtained in Working Example 1.

FIG. 4 is a schematic illustration that shows the method of evaluating the sphericity of a fuel kernel.

FIG. 5 is a graph that shows the relationship between the viscosity of the feedstock liquid and the yield of the fuel kernels.

FIG. 6 is a photograph by light microscope that shows a section of an ammonium diuranate particle obtained in Comparative Example 2.

EXPLANATION OF REFERENCE NUMERALS

Reference numeral 1 denotes a reaction vessel, 2 a nitric acid storage tank, 3 a uranium oxide introducing hopper, 4 a heater, 5 a device of treating NOx gas, and 6 a stirring device.

BEST MODE TO CARRY OUT THE INVENTION (1) Feedstock Liquid

The feedstock liquid according to the present invention is a liquid including uranyl nitrate that is appropriately used for the production of fuel kernels for high-temperature gas reactors. The feedstock liquid of the present invention has a viscosity from $4.0 \times 10^{-2}$ to $6.5 \times 10^{-2}$ Pa·s, which range corresponds to 40 to 65 cP. When the viscosity of the feedstock liquid is within the range, ammonium diuranate particles with good sphericity can be produced. On the other hand, if the viscosity is smaller than the range, the obtained ammonium diuranate particles tend to have bad shapes, or ammonium diuranate particles with good sphericity may not be produced. If the viscosity exceeds the upper limit, the viscosity of the feedstock liquid may be too large to let the dripping nozzle drip the feedstock liquid normally, because the nozzle is stopped up. Besides, such a high viscosity may lead to the production of ammonium diuranate particles with defects in the inside structure.

The feedstock liquid with such a viscosity within the range may include a solution comprising uranyl nitrate, tetrahydrofurfuryl alcohol, and polyvinyl alcohol.

In place of tetrahydrofurfuryl alcohol may be used a water-soluble cyclic ether with 1 to 4 carbon atoms, such as oxetane, tetrahydrofuran, and dioxane; and a water-soluble cyclic ether with an alkanol group, made by bonding an alkanol group having from 1 to 3 carbon atoms with the water-soluble cyclic ether, such as 2,5-tetrahydrofuran dimethanol.

In place of polyvinyl alcohol may be used a synthetic polymer such as sodium polyacrylate and polyethylene oxide; a cellulose polymer such as carboxymethylcellulose, hydroxyethylcellulose, methyl cellulose, and ethyl cellulose; a starchpolymer such as soluble starch and carboxymethyl starch; and a water-soluble naturalpolymer such as dextrin and galactan.

The amount of uranyl nitrate in the feedstock liquid is typically from 0.6 to 0.9 mol-U/L. When the amount of uranyl nitrate is within the range, uranium dioxide fuel kernels with good sphericity can be produced with good reproducibility. When the amount is outside the range, uranium dioxide fuel kernels with poor sphericity may be produced.

The amount of THFA in the entire feedstock liquid is preferably from 40 to 50% by volume, more preferably from 43 to 47% by volume. When the amount of THFA is within the range, uranium dioxide fuel kernels with good sphericity can be produced with good reproducibility. When the amount is outside the range, uranium dioxide fuel kernels with poor sphericity may be produced.

The amount of PVA in the feedstock liquid should typically be from 10 to 15 g/L. The amount of PVA is within the range makes it possible to keep the viscosity of the feedstock liquid within the favorable range, which leads to the production of uranium dioxide fuel kernels having good sphericity with desirable reproducibility. An amount of less than 10 g/L may result in the production of uranium dioxide fuel kernels with poor sphericity. On the other hand, if the amount exceeds 15 g/L, uranium dioxide fuel kernels with defects in the inside structure may be produced.

The feedstock liquid according to the present invention may further include other components, as long as such components do not hinder achievement of the objectives of the present invention. Examples of the other components may be a thickening agent and a stabilization agent.

(2) Method of Preparing Feedstock Liquid

The basic steps of the method of preparing the feedstock liquid according to the present invention include, as shown in FIG. 1, mixing a uranyl nitrate solution with THFA to prepare a uranyl nitrate mixture, dissolving PVA in water to prepare an aqueous PVA solution, mixing the aqueous PVA solution with THFA to prepare a PVA solution, and mixing the uranyl nitrate mixture with the PVA solution.

(2-1) Preparation of Uranyl Nitrate Solution

The uranyl nitrate solution may be prepared by the method of preparing the uranyl nitrate solution according to the present invention.

In the preparation method, the molar ratio of the nitric acid (A) to the uranium (B), both involved in the reaction, which is A/B, the value obtained by dividing the number of moles of the used nitric acid by the number of moles of the uranium included in a uranium oxide, for example, triuranium octaoxide used in the reaction, is important.

The uranyl nitrate solution may be obtained by reacting nitric acid with a uranium oxide, for example, triuranium octaoxide, in accordance with the following reaction formula:

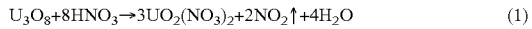

$$U_3O_8 + 8HNO_3 \rightarrow 3UO_2(NO_3)_2 + 2NO_2\uparrow + 4H_2O \quad (1)$$

Another possible reaction between nitric acid and the uranium oxide, for example, triuranium octaoxide, is shown by the following reaction formula.

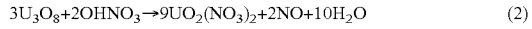

$$3U_3O_8 + 20HNO_3 \rightarrow 9UO_2(NO_3)_2 + 2NO + 10H_2O \quad (2)$$

Therefore, the molar ratio should be from 2.1 to 2.6, particularly from 2.3 to 2.5.

When the molar ratio is less than 2.1, there is a probability that the uranium oxide, for example triuranium octaoxide, may not be completely dissolved in nitric acid and uranium oxide residues may be present. On the other hand, if the molar ratio exceeds 2.6, the amount of nitric acid used in the reaction increases, which, in turn, may increase the production cost of the uranyl nitrate solution. Besides, the amount of the nitrogen originating from nitric acid in the waste fluid is increased, which may give a burden to the environment.

The present invention employs an aqueous nitric acid solution, the concentration of which is typically 50% by mass or more, preferably 60% by mass or more.

Although the uranium oxide, such as triuranium octaoxide, may be in either form of granule or powder, the uranium oxide in the form of powder, which is apt to be dissolved quickly and completely in nitric acid, is preferable.

In a preferable embodiment of this method, the nitric acid is reacted with the uranium oxide, such as triuranium octaoxide, at a temperature from 70 to 110° C.

If the temperature is lower than 70° C., the uranium oxide may not be dissolved sufficiently and a uranyl nitrate solution with a uranium content within the above-mentioned range may not be prepared.

For the uranium oxide in the present invention, triuranium octaoxide is appropriately used. However, uranium oxides other than triuranium octaoxide, such as uranium dioxide or uranium trioxide, may be employed.

The method of preparing the uranyl nitrate solution should further include a step for chemically treating NOx gas generated during the reaction.

The method of treating NOx gas in the step may be a wet process in which NOx gas is absorbed in an alkali, and a dry process in which NOx gas is reduced in the presence of a catalyst.

Examples of the alkali may include sodium hydroxide, sodium carbonate, magnesium hydroxide, calcium hydroxide, and ammonia. The catalyst may include a three way catalyst.

An example of the apparatus for preparing the uranyl nitrate solution according to the present invention is shown in FIG. 2.

In FIG. 2, reference letter A denotes an apparatus for preparing the uranyl nitrate solution, reference numeral 1 a reaction vessel, 2 a nitric acid storage tank, 3 a uranium oxide introducing hopper, 4 a heater, 5 a device of treating NOx gas, and 6 a stirring device.

The reaction vessel 1 is a vessel in which the uranium oxide, for example triuranium octaoxide, is reacted with the nitric acid, so that the uranyl nitrate solution is produced.

Although there are no special limitations on the reaction vessel 1, preferable is a vessel that has corrosion resistance, heat resistance, and pressure resistance, and that can be sealed tightly.

Materials for the reaction vessel 1 may include aluminum alloy, magnesium alloy, titanium alloy, and stainless steel.

There are no limitations on the size and the shape of the reaction vessel. However, when criticality safety is secured by controlling the shape and size of the vessel, the reaction vessel is so formed as to satisfy the required shape and size.

The nitric acid storage tank 2 is a tank in which the nitric acid is stored. The tank is connected to the reaction vessel 1 via pipes and a pump P2.

There are no limitations on the material, size, and shape of the nitric acid storage tank 2.

The nitric acid stored in the nitric acid storage tank 2 is transferred to the reaction vessel 1 with the pump P2. The transference may be done continuously or intermittently.

The uranium oxide introducing hopper 3 contains the uranium oxide, such as triuranium octaoxide. The hopper 3 is connected to the reaction vessel 1 via a feeder, which is not shown in the figures.

There are no special limitations on the material, size, and shape of the uranium oxide introducing hopper 3.

The uranium oxide, for example triuranium octaoxide, stored in the uranium oxide introducing hopper 3 is introduced into the reaction vessel 1 via the feeder.

For the feeder may be used any known feeder, examples of which are a rotary feeder or a table feeder.

The heater 4 is a device for heating the uranyl nitrate solution.

For the heater 4 may be employed any known heating device, as long as it is capable of heating the uranyl nitrate solution to an appropriate temperature. The heater includes heating devices with heating means utilizing electricity, hot water, microwave irradiation, etc.

The device of treating NOx gas 5 is a device for treating NOx gas, a byproduct of the reaction, to a harmless substance. The device is connected to the reaction vessel 1 via pipes and a pump P1.

There are no special additional requirements that the device has to satisfy, as long as the concentration of NOx gas in the discharged gas, obtained by treating the NOx gas, is less than the environmental standard.

There are no special limitations on the stirring device 6. Examples of the stirring device 6 are a slow rotating stirrer and a medium-speed rotating stirrer.

The rotating speed of the rotor(s) of the stirring device 6 should be from 100 to 300 rpm. The rotation may be continuous or intermittent.

With the apparatus for preparing the uranyl nitrate solution A, the uranyl nitrate solution can be prepared, for example, in the following way.

Firstly, a predetermined amount of the uranium oxide, for example triuranium octaoxide powder, is sent to the reaction vessel 1 from the uranium oxide introducing hopper 3.

Then, after the NOx gas treating device 5 is activated, a predetermined amount of the nitric acid is transferred to the reaction vessel from the nitric acid storage tank 2.

The stirring device 6 and the heater 4 are activated thereafter.

The reaction mixture in the reaction vessel 1 is kept at a predetermined constant temperature, and reacted for a predetermined period of time.

The uranyl nitrate solution can be obtained by taking the solution out of the reaction vessel 1 after the reaction is terminated, by known discharging means.

(2-2) Preparation of Uranyl Nitrate Mixture

The uranyl nitrate mixture is prepared by mixing the uranyl nitrate solution thus prepared with THFA.

The total amount of THFA in the entire feedstock liquid is typically from 40 to 50% by volume, preferably from 43 to 47% by volume. When the total amount of THFA in the feedstock liquid is within the range, the uranyl nitrate content in the drops formed from the feedstock liquid is not too small, and the viscosity of the feedstock liquid is made appropriate. The amount in the range makes it possible to form drops leading to the final products, fuel kernels with good sphericity. The amount of THFA used for the preparation of this uranyl nitrate mixture should be from 50 to 99% by volume, from the viewpoint of easiness of mixing.

The mixing of the uranyl nitrate and THFA should be carried out while the mixture is being cooled to 15° C. or lower. The mixing operation is preferably done in a storage tank in which the feedstock liquid is prepared. The storage tank may be any tank, if the mixing of the uranyl nitrate and THFA can be done in the tank with the mixture being kept at about 15° C. or lower.

(2-3) Preparation of Aqueous PVA Solution

The aqueous PVA solution can be obtained by mixing PVA and water at room temperature, preferably at a heated temperature.

In the present invention, dried PVA is preferably used. The reason for the employment of dried PVA is that the accurate weighing of PVA makes it possible to reproducibly prepare the feedstock liquid to be used for appropriately preparing ammonium diuranate particles, from which uranium dioxide particles with good sphericity are produced with a good yield.

The dried PVA is obtained by sufficiently drying PVA that has absorbed moisture. The wet PVA may be dried to such an extent that is achieved by, for example, placing a wet PVA in a desiccator that includes a desiccant and keeping the inside of the desiccator under high vacuum until the weight of the PVA no longer decreases. The dried PVA is obtained by, for example, placing a wet PVA in a drier, such as a desiccator with a desiccant therein, and keeping the inside of the drier under high vacuum at least for one whole day and night. For the method of drying PVA, other than keeping wet PVA with a desiccant under normal pressure, or high vacuum, as described above, may be employed a heat-drying method comprising heating PVA that has absorbed moisture to a high temperature under normal pressure or reduced pressure, or a freeze-drying method comprising repeating freezing and defrosting a wet PVA under high vacuum. The PVA thus dried should be kept in a dried condition so that the PVA will not absorb moisture until it is used in the method according to the present invention.

The temperature, including the heating temperature, at which the treatment is carried out, and the time period for which the treatment, including the heating, is continued, in the heat-drying method or the freeze-drying method are not the same in all cases, but decided case by case depending on the conditions such as the treated amount of PVA and the method of heating. The operator should judge that dried PVA has been obtained when the decreasing of the weight of the treated PVA is ceased. Needless to say, heating conditions under which PVA deforms, changes in quality, or decomposes must not be employed. Typically, the heating temperature is from 70 to 90° C., and the time period of heating is approximately from 20 minutes to 2 hours.

It is not necessary to employ special heating devices for the heat-treating of PVA that has absorbed moisture. However, examples of such devices useful for this invention are a furnace or tube in which a wet PVA is placed and heated, and a plate or basket where a wet PVA is placed and blown by hot air.

When PVA dried by being kept with the desiccant for a time period is employed, a PVA having been dried by being stored for a time in a container, such as a desiccator, with a desiccant such as activated carbon, activated aluminum, or silica gel, is used. For the desiccant, silica gel is preferable. The period of the storing is decided case by case according to the kind of PVA to be stored and the amount thereof. The operator should judge that she has obtained dried PVA when the decreasing of the weight of the PVA is ceased. In summary, suit ably employed in the present invention is dried PVA obtained by heating or drying with a desiccant a PVA that has absorbed moisture.

The amount of the PVA in the feedstock liquid should typically be from 10 to 15 g/L. When the amount is within the range, the viscosity of the feedstock liquid can be kept in a favorable condition and ammonium diuranate particles with good sphericity can be produced reproducibly. When the amount is outside the range, ammonium diuranate particles with poor sphericity may be produced.

The amount of the PVA in the aqueous PVA solution is typically from 6 to 9% by mass, preferably from 7 to 8% by mass. When the amount of the PVA in the aqueous PVA solution is within the range, the viscosity of the feedstock liquid, which includes uranyl nitrate, can favorably be kept in the range between $4.0 \times 10^{-2}$ and $6.5 \times 10^{-2}$ Pa·s at 15° C. Furthermore, the range does not cause the residue of undissolved PVA in the aqueous PVA solution.

When the amount of the PVA in the aqueous PVA solution is less than 6% by mass, the resultant feedstock liquid has a too small viscosity, which prohibits the feedstock liquid from being dripped properly. On the other hand, the PVA content of more than 9% by mass cause the residue of undissolved PVA in its aqueous solution.

The heating temperature, or the temperature at which the mixture of the PVA and water is heated, should be at least 75° C. The heating temperature of 75° C. or higher makes it possible to prepare a uniform aqueous PVA solution without the residue of undissolved PVA.

The mixing of the PVA and water is usually done with stirring. The period of stirring is typically from 80 to 100 minutes. When the mixture is stirred while being heated, the water content of the mixture may decrease because of the evaporation of the water. The evaporated amount of water is made up for by adding water to the heated mixture suitably.

(2-4) Preparation of PVA Solution

Then, the PVA solution is prepared by mixing the aqueous PVA solution with THFA.

The relationship between the amount of the aqueous PVA solution and that of THFA is such that the amount of THFA is from 1 to 50% by volume, particularly from 30 to 40% by volume, based on the entire amount of THFA in the feedstock liquid, for such an amount of the aqueous PVA solution that the aqueous PVA solution accounts for 15 to 20% by volume of the whole feedstock liquid.

When the amount of THFA is within the range, a PVA solution in which PVA is uniformly dispersed can be obtained.

Also, when THFA and the aqueous PVA solution are mixed, THFA should be added before the temperature of the aqueous PVA solution is lowered to 50° C. at the lowest, preferably to 60° C.

If THFA is added to the aqueous PVA solution after the temperature of the solution is cooled below 50° C., the PVA in the PVA solution may set to gel, which may cause some inconvenience when the feedstock liquid is dripped.

(2-5) Mixing of Uranyl Nitrate Mixture and PVA Solution

The feedstock liquid is prepared by mixing the uranyl nitrate mixture with the PVA solution.

The uranyl nitrate mixture and the PVA solution are mixed with stirring, which is followed by degassing and adjusting the volume by adding pure water. This step makes the uranium content in each batch of the feedstock liquid the same. Thus, ammonium diuranate particles with good sphericity and the flawless inside structure, each of which particles contains the same weight of uranium, are obtained.

The uranium content of the feedstock liquid, after the volume and viscosity thereof are adjusted, should be from 0.6 to 0.9 mol-U/L.

When the uranium content of the feedstock liquid after the adjustment of the volume thereof is less than 0.6 mol-U/L, the amount of PVA is increased relatively, which means that the viscosity of the feedstock liquid is too large. As a result, the dripping nozzle may be stopped up, which hinders the feedstock liquid from being dripped, and ammonium diuranate particles with defects in the inside structure thereof may be produced.

On the other hand, when the uranium content of the feedstock liquid after the adjustment of the volume thereof is more than 0.9 mol-U/L, the amount of PVA is decreased relatively, which means that the viscosity of the feedstock liquid is lowered. The lowered viscosity may disadvantageously affect the quality of the fuel kernels, such as the sphericity thereof.

(3) Production of Fuels for High-temperature Gas Reactor

The feedstock liquid thus produced is cooled to a predetermined temperature and the viscosity thereof is adjusted. Then, the feedstock liquid is dripped from a dripping nozzle with a small diameter to an aqueous ammonia solution.

The drops dripped from the nozzle pass through an atmosphere of ammonia gas in the process of falling toward the surface of the aqueous ammonia solution. This ammonia gas brings about gelation on the surface of each drop, which alleviates the deformation caused by the impact that the drops receive when the drops fall to and hit the surface of the aqueous ammonia solution. Uranyl nitrate included in the drops that have fallen into the solution reacts with ammonia sufficiently, and the drops are changed to ammonium diuranate particles, which may sometimes be abbreviated to "ADU particles".

The ADU particles thus formed are washed, dried, and then calcined in the atmosphere, which changes the ADU particles in to uranium trioxide particles. The obtained uranium trioxide particles are reduced and sintered, through which steps the uranium trioxide particles are changed into uranium dioxide particles with highdensity, in a condition like ceramics. The uranium dioxide particles are sieved, or classified, and fuel kernel particles with a diameter within a predetermined range are obtained.

The structure of a fuel particle for high-temperature gas reactors made by using the fuel kernel was explained hereinbefore.

The fuels for the high-temperature gas reactor are fabricated into fuel compacts or fuel pebbles. The fuel compacts or pebbles are obtained by pressing or molding the fuels with a graphite matrix material made of graphite powder, a binder and other components into cylinders with contents, hollow cylinders, or spheres, and calcining the pressed or molded.

EXAMPLES

The invention is described by way of working and comparative examples. Needless to say, the invention is not limited to the working examples only but can be worked with suitable modification within the scope of the gist of the invention.

Working Example 1

In the aforementioned embodiment, the feedstock liquid was prepared under the conditions specified below. The following conditions were employed when the feedstock liquid with a viscosity of $5.2 \times 10^{-2}$ Pa·s, which corresponds to 52 cP, at 15° C. was prepared.

Amount of THFA in the entire feedstock liquid: 45 vol. %

Amount of the aqueous PVA solution in the entire feedstock liquid: 18 vol. %

Time necessary for PVA to dissolve in water: 90 minutes

Concentration of the aqueous PVA solution: 7.3 mass %

Amount of THFA included in the PVA solution based on the entire amount of THFA included in the feedstock liquid: 37 vol. %

Uranium content of the feedstock liquid after the adjustment of the volume of the feedstock liquid: 0.76 mol/L Ratio of the moles of nitric acid to those of uranium after the adjustment of the volume of the feedstock liquid: 2.3

Feedstock liquids with various viscosities were prepared by changing the conditions. Then, fuel kernels were produced according to the method described hereinbefore. The viscosities of the feedstock liquids were measured with an oscillating viscometer named "Viscomate VM-1A-L" produced by Yamaichi Electronics Co., Ltd.

[Methods and Results of Evaluation]

The inside structure of ammonium diuranate particles, or ADU particles, produced from the feedstock liquid prepared in the examples was evaluated.

The ADU particles thus formed were dried, and then calcined in the atmosphere, which changed the ADU particles into uranium trioxide particles. The obtained uranium trioxide particles were reduced and sintered. Through the reducing and sintering steps the uranium trioxide particles were changed into uranium dioxide particles with high density, in a condition like ceramics. The uranium dioxide particles were sieved, or classified, and fuel kernel particles, or uranium dioxide particles, with a diameter within a predetermined range were obtained. The sphericity of the obtained fuel kernels, or uranium dioxide particles, was evaluated. Also, the yields of the fuel kernels produced from feedstock liquids with various viscosities were calculated.

[Method of Evaluating the Inside Structure of the ADU Particles]

The obtained ADU particles were polished, and the sections thereof were observed with a light microscope, so that whether defects such as cracks existed or not was determined. The observation of the sections confirmed that the particles of uniform inside structure had been formed. See FIG. 3.

[Method of Evaluating the Sphericity of a Fuel Kernel]

The sphericity values of the fuel kernels, or uranium dioxide particles, were measured by the PSA method. The PSA method is, as illustrated in FIG. 4, a method using a photo diode, a slit, and a light source. A light beam emitted from the light source passes through the slit to a fuel kernel, or a uranium dioxide particle, and the shadow of the drop moving between the photodiode and the slit is detected with the photodiode. The particle size is obtained from the shadow detected with the photodiode. The steps that I have just explained are repeated and the shadows of the fuel kernel are detected from various directions. From the particle sizes obtained from the shadows, the sphericity of the fuel kernel, or the uranium dioxide particle, can be calculated.

By this PSA method, one uranium dioxide particle was measured fifty times, and the sphericity was defined by the ratio of the maximum particle size to the minimum particle size. One hundred uranium dioxide particles were measured and the sphericity values thereof were calculated. When 95% or more of the particles have a sphericity of 1.2 or less, for example, the particles can be considered to have good sphericity as a whole.

[Evaluation of Yield of the Fuel Kernels]

The yield was evaluated in accordance with the following equation. The result of the evaluation is shown in FIG. 5.

$$Wa/Wb \times 100\ (\%)$$

Wa: The weight (g) of uranium that passed the particle size selection examination and the sphericity selection examination, explained below.

Wb: The weight (g) of uranium examined.

The obtained fuel kernel particles were subjected to a particle size selection and a sphericity selection. The particle size selection was carried out by screening out the fuel kernel particles using a few sieves with different sieve openings and selecting fuel kernel particles with a particle size within a predetermined range. The sphericity selection was carried out by supplying the fuel kernel particles to a slightly inclined and vibrated plate and selecting fuel kernel particles that rolled down the plate straight.

The evaluation of the inside structure of the ammonium diuranate particles, or ADU particles, and that of the sphericity of the fuel kernels showed that good ammonium diuranate particles, or ADU particles, and fuel kernels were obtained. Furthermore, from the graph in FIG. 5, it was understood that the feedstock liquid with a viscosity between about $4.0 \times 10^{-2}$ and $6.5 \times 10^{-2}$ Pa·s, which corresponds to 40 to 65 cP, at 15° C. provided a good yield. The data proved that the feedstock liquid according to the present invention was capable of providing fuel kernels of good quality.

Working Example 2

A liquid mixture was obtained by adding 300 g of powdery polyvinyl alcohol, or PVA powder, to 4 L of pure water. The mixture was stirred for 90 minutes at 95° C., which resulted in an aqueous PVA solution, the PVA content of which was 7% by mass. No undissolved PVA residue was observed in the aqueous solution thus prepared. Then, to the aqueous PVA solution at 80° C. was added 4 L of tetrahydrofurfuryl alcohol, or THFA, and a PVA solution was obtained.

The PVA solution thus obtained, a uranyl nitrate mixture prepared by mixing about 9 L of the uranyl nitrate solution with about 7 L of THFA, and pure water were mixed, so that a feedstock liquid including uranyl nitrate was prepared.

The viscosity of the feedstock liquid prepared in Working Example 2 was measured with the viscometer, a product of Yamaichi Electronics Co., Ltd. The viscosity was $5.5 \times 10^{-2}$ Pa·s at 12° C., which corresponds to $5.0 \times 10^{-2}$ Pa·s at 15° C.

Ammonium diuranate particles were produced by dripping the feedstock liquid to the aqueous ammonia solution. After being dried, the particles were cut along a plane including the diameter of each particle, and the sections were observed. The observation proved that each particle had a uniform inside structure. The sphericity values of the fuel kernels were evaluated in accordance with the method of evaluating the sphericity of a fuel kernel explained hereinbefore. It turned out that the percentage of the inferior fuel kernels was not more than 1%.

Comparative Example 1

A feedstock liquid was prepared according to the steps of Working Example 2 except that the amount of PVA was 230 g, which means that an aqueous PVA solution, the PVA content of which was 5.4% by mass, was used.

The viscosity of the feedstock liquid prepared in this comparative example was measured with the same viscometer. The result was that the viscosity was $3.5 \times 10^{-2}$ Pa·s at 15° C., which was lower than the viscosity of the feedstock liquid prepared in Working Example 2.

Ammonium diuranate particles produced from the feedstock liquid were dried, and calcined in the atmosphere, which changed the ADU particles into uranium trioxide particles. The obtained uranium trioxide particles were reduced and sintered. Through the reducing and sintering steps the uranium trioxide particles were changed into uranium dioxide particles with high density, in a condition like ceramics. The uranium dioxide particles were sieved, or classified, and fuel kernels, or uranium dioxide particles, with a particle size within a predetermined range were obtained.

The obtained fuel kernels, or uranium dioxide particles, were subjected to the sphericity evaluation according to the method explained hereinbefore, and fuel kernels, or uranium dioxide particles, with an inferior sphericity were removed. 7 percent of the fuel kernels were rejected.

It was considered that this result was caused by the low viscosity of the feedstock liquid; the low viscosity lowered the surface tension of each drop falling from the dripping nozzle, which made it difficult for each drop to keep its shape spherical, and led to a deformation of the corresponding uranium diuranate particle.

Comparative Example 2

A feedstock liquid was prepared according to the steps of Working Example 2 except that the amount of PVA was 400 g, which means that an aqueous PVA solution, the PVA content of which was 9.1% by mass, was used.

A residue was observed in the aqueous PVA solution obtained in this comparative example, and a uniform aqueous PVA solution in which PVA was perfectly dissolved was not obtained. Ammonium diuranate particles were produced by dripping the feedstock liquid to the aqueous ammonia solution. After being dried, the particles were cut along a plane including the diameter of each particle, and the sections were observed. The observation showed that the particles had defective inside structures. See FIG. 6. It was considered that this result was caused by fact that the PVA content of the feedstock liquid was too large to enable the reaction between ammonia and uranyl nitrate to advance to the central part of each drop.

Working Example 3

Powdery uranium oxide was added to nitric acid and the mixture was stirred for 1.5 hours at 100° C. Thus, a uranyl nitrate solution, the uranium content of which was 2.4 mol-U/L, was prepared. To the uranyl nitrate solution was added 4 L of tetrahydrofurfuryl alcohol, and the resultant was mixed. A uranyl nitrate mixture was obtained. On the other hand, tetrahydrofurfuryl alcohol was added to an aqueous 7 mass% polyvinyl alcohol solution, and a polyvinyl alcohol solution was prepared. The polyvinyl alcohol solution was mixed with the uranyl nitrate mixture, and the resultant was stirred. Water was added to the stirred, which provided a feedstock liquid. The viscosity of the feedstock liquid was $5.3 \times 10^{-2}$ Pa·s (53 cP) at 10° C., which corresponds to $4.3 \times 10^{-2}$ Pa·s at 15° C.

The PVA was heated to 85° C. and kept at around the temperature for 50 minutes with an electric heater in advance, so that the thickening agent was completely dried. Then, the dried PVA was weighed.

24 L of the feedstock liquid thus prepared was fed to the feedstock liquid dripping device via a flow regulating valve at a flow rate of 240 cm³/minute with a feedstock liquid feeding pump. The feedstock liquid was dripped from the dripping nozzle of the feedstock liquid dripping device that was being vibrated at a frequency of 75 Hz to a tank in which a 28% aqueous ammonia solution was stored, through an atmosphere of ammonia gas. Ammonium diuranate particles were produced from the drops dripped from the nozzle.

Then, the ammonium diuranate particles thus produced were transferred to and placed in a post-treatment tank. The particles were aged for 1 hour at 80° C. with the post-treatment tank being rotated. The aged ammonium diuranate particles were washed with hot water of 80° C., which was followed by a washing with ethyl alcohol of 70° C. for 30 minutes. The washed was dried at 100° C. for 3 hours. Dried ammonium diuranate particles were obtained.

The dried ammonium diuranate particles were calcined at 550° C. for 3 hours in the atmosphere, which changed the ammonium diuranate particles to uranium trioxide particles. The uranium trioxide particles were reduced at 600° C. for 3 hours in a reducing atmosphere of hydrogen/nitrogen mixed gas. The reduced was sintered at 1550° C., and uranium dioxide particles with a high density, the condition of which was like ceramics, were produced.

After the uranium dioxide particles were subjected to the classification, specifically the particle size selection and the sphericity selection, the sphericity values of the classified uranium dioxide particles were measured. The average of the sphericity values was 1.04. The yield of the fuel kernels was 99.1% by mass.

Working Example 4

Fuel kernel particles were produced in the same way as the fuel kernels of Working Example 1, except that polyvinyl alcohol powder that had been stored in a desiccator with silica gel for three days was employed as a thickening agent. The viscosity of the feedstock liquid was $5.1 \times 10^{-2}$ Pa·s (51 cP) at 10° C., which corresponds to $4.2 \times 10^{-2}$ Pa·s at 15° C. The result was that the average sphericity of the fuel kernel particles was 1.05 and the yield thereof was 98.5% by mass.

Comparative Example 3

Fuel kernel particles were produced in the same way as the fuel kernel particles of Working Example 3, except that polyvinyl alcohol powder including 9% by mass of moisture was employed as a thickening agent. The viscosity of the feedstock liquid was $4.4 \times 10^{-2}$ Pa·s (44 cP) at 10° C., which corresponds to $3.4 \times 10^{-2}$ Pa·s at 15° C. The result was that the average sphericity of the fuel kernel particles was 1.08 and the yield thereof was 92% by mass.

The fuel kernel particles with good sphericity produced in Working Examples 3 and 4 had an excellent yield, while those produced in Comparative Example 3 had a poorer one. I consider that this difference was caused by the fact that the PVA was not weighed accurately and the amount of the used PVA was smaller than the amount that should have been added, which lowered the viscosity of the feedstock liquid thus prepared for the production of ammonium diuranate particles.

Working Example 5

In a stainless-steel tank with a NOx gas treating device and a heater, the dimensions of which were 0.3 m in length, 0.3 min width, and 0.5 min height, was placed 5.1 kg of triuranium octaoxide powder. 3.3 L of a nitric acid was gradually added to the tank, so that the ratio of the moles of the nitric acid to those of uranium was 2.3. After the termination of the addition, the heater was actuated to heat the liquid in the tank to 100° C. and to keep the liquid at around the temperature. Then, triuranium octaoxide and the nitric acid were allowed to react.

In 90 minutes after the beginning of the reaction, the triuranium octaoxide powder was completely dissolved, and no undissolved residue was observed in the solution in the tank.

Comparative Example 4

In the same tank as that used in Working Example 5 was placed 5.1 kg of triuranium octaoxide powder. 2.9 L of a nitric acid was gradually added to the tank, so that the ratio of the moles of the nitric acid to those of uranium was 2.05. After the termination of the addition, the heater was actuated to heat the liquid in the tank to 100° C. and to keep the liquid at around the temperature. Then, triuranium octaoxide and the nitric acid were allowed to react.

In 90 minutes after the beginning of the reaction, the triuranium octaoxide powder was not completely dissolved, and 15 g of the undissolved residue remained in the solution.

I claim:

1. A method of preparing a feedstock liquid used for production of ammonium diuranate particles, which comprises mixing a uranyl nitrate solution and tetrahydrofurfuryl alcohol to produce a uranyl nitrate mixture (X), dissolving polyvinyl alcohol in water at a temperature of 75° C. or higher to produce an aqueous polyvinyl alcohol solution, mixing the aqueous polyvinyl alcohol solution with tetrahydrofurfuryl alcohol to produce a polyvinyl alcohol solution (Y), mixing the uranyl nitrate mixture (X) with the polyvinyl alcohol solution (Y) to form a mixed liquid (X) (Y), and adjusting a viscosity of said mixed liquid (X) (Y) to form a feedstock liquid which has a viscosity from $4.0 \times 10^{-2}$ to $6.5 \times 10^{-2}$ Pa·s at 15° C., wherein a total amount tetrahydrofurfuryl alcohol in said feedstock liquid is 40 to 50% by volume based on the entire volume of said feedstock liquid.

2. The method according to claim 1, wherein a total amount of the aqueous polyvinyl alcohol solution in the feedstock liquid is 15 to 20% by volume based on an entire volume of the feedstock liquid.

3. The method according to claim 1, wherein the mixing of the uranyl nitrate mixture with the polyvinyl alcohol solution is carried out under stirring, which is followed by degassing and adjusting the volume by adding pure water.

4. The method according to claim 1, wherein the uranium content in the feedstock liquid is from 0.6 to 0.9 mol-U/L.

5. The method according to claim 1, wherein when the polyvinyl alcohol solution is prepared by mixing the aqueous polyvinyl alcohol solution with tetrahydrofurfuryl alcohol, tetrahydrofurfuryl alcohol is added before a temperature of the aqueous polyvinyl alcohol decreases to 50° C. at the lowest.

6. The method according to claim 1, wherein the polyvinyl alcohol is weighed when it is dry.

7. The method according to claim 6, wherein the dry polyvinyl alcohol is made by heating a polyvinyl alcohol that has absorbed moisture.

8. The method according to the claim 6, wherein the dry polyvinyl alcohol is a polyvinyl alcohol that has been stored with a desiccant.

9. The method according to claim 1, reacting nitric acid with a uranium oxide according to both of the following formulas:

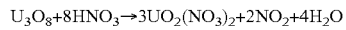

so that the molar ratio (A/B) of nitric acid (A) to uranium (B) is from 2.3 to 2.5.

10. The method according to claim 9, wherein the reaction between nitric acid and the uranium oxide is carried out at a temperature from 70 to 110° C.

11. A method according to claim 9, further comprising a step in which NOx gas produced in the reaction is treated chemically.

12. The method according to claim 1, wherein the aqueous polyvinyl alcohol solution contains from 6 to 9 mass % of polyvinyl alcohol.

13. The method according to claim 12, wherein from 1 to 50% by volume of the tetrahydrofurfuryl alcohol based on an entire volume of the tetrahydrofurfuryl alcohol included in the feedstock liquid is mixed with the aqueous polyvinyl alcohol solution at a temperature of at least 50° C.

14. The method according to claim 2, wherein the mixing of the uranyl nitrate mixture with the polyvinyl alcohol solution is carried out under stirring, which is followed by degassing and adjusting the volume by adding pure water.

15. The method according to claim 2, wherein when the polyvinyl alcohol solution is prepared by mixing the aqueous polyvinyl alcohol solution with tetrahydrofurfuryl alcohol, tetrahydrofurfuryl alcohol is added before a temperature of the aqueous polyvinyl alcohol decreases to 50° C. at the lowest.

16. The method according to claim 2, wherein the uranium content in the feedstock liquid is from 0.6 to 0.9 mol-U/L.

17. The method according to claim 3, wherein the uranium content in the feedstock liquid is from 0.6 to 0.9 mol-U/L.

18. The method according to claim 3, wherein when the polyvinyl alcohol solution is prepared by mixing the aqueous polyvinyl alcohol solution with tetrahydrofurfuryl alcohol, tetrahydrofurfuryl alcohol is added before a temperature of the aqueous polyvinyl alcohol decreases to 50° C. at the lowest.

19. The method according to claim 4, wherein when the polyvinyl alcohol solution is prepared by mixing the aqueous polyvinyl alcohol solution with tetrahydrofurfuryl alcohol, tetrahydrofurfuryl alcohol is added before a temperature of the aqueous polyvinyl alcohol decreases to 50° at the lowest.

* * * * *